Feb. 9, 1943.   E. E. BLONDEAU   2,310,611
ELECTRICAL EXPLORATION OF GEOLOGICAL STRATA
Filed Dec. 23, 1938
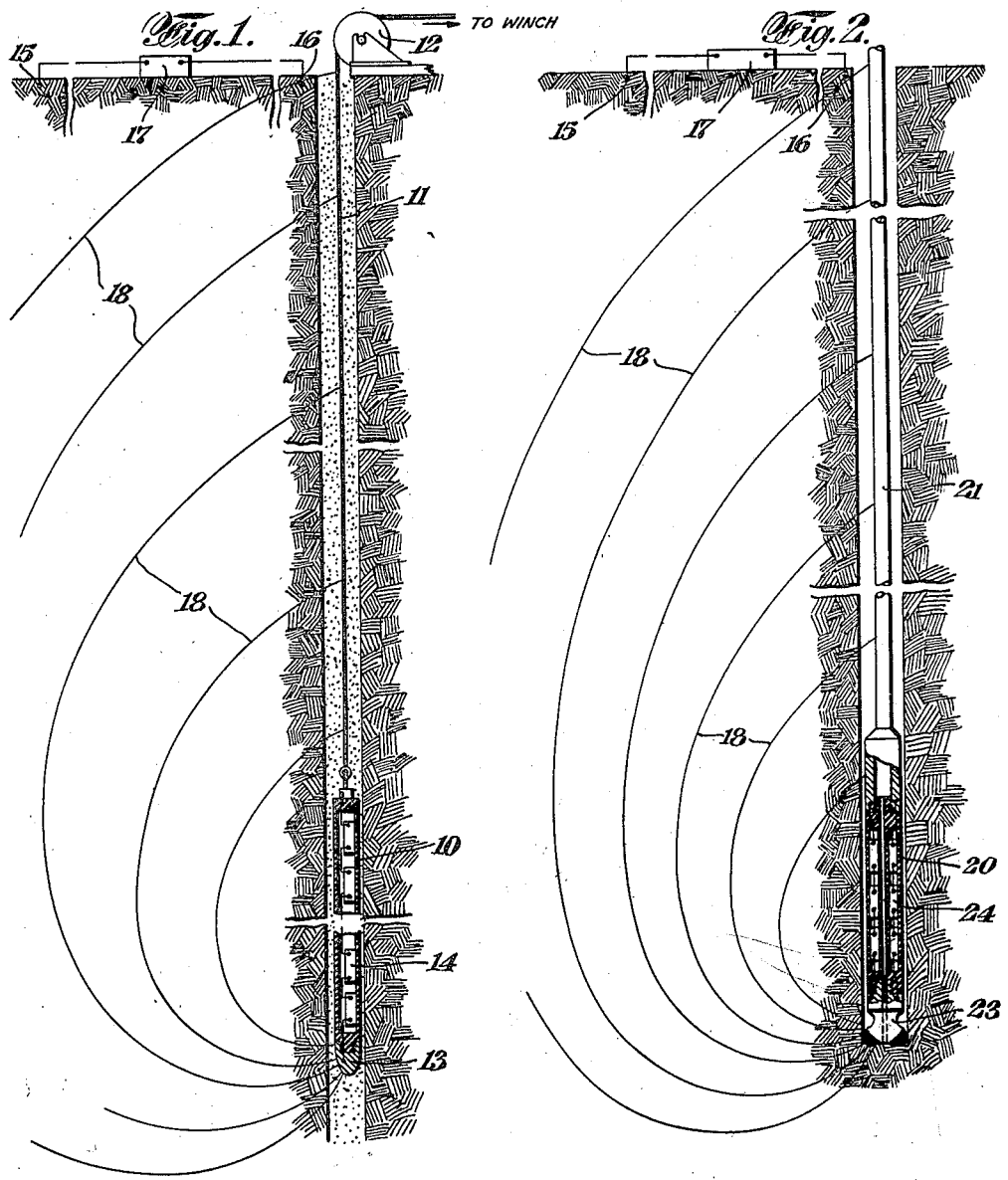
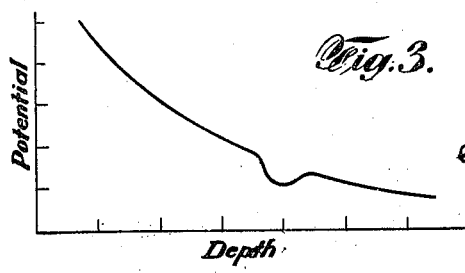
INVENTOR
Ernest E. Blondeau
BY
Kenyon & Kenyon
ATTORNEYS.

Patented Feb. 9, 1943

2,310,611

UNITED STATES PATENT OFFICE 2,310,611

ELECTRICAL EXPLORATION OF GEOLOGICAL STRATA

Ernest E. Blondeau, Tulsa, Okla., assignor to Geophysical Research Corporation, New York, N. Y., a corporation of New Jersey Application December 23, 1938, Serial No. 247,402

9 Claims. (Cl. 255—1.8)

This invention relates to electrical exploration of geological strata traversed by bore holes. Heretofore, in the practice of electrical well-logging, a source of electric current has been located on the surface of the earth and current has been applied to the geological strata to be explored through the medium of an insulated conductor. The provision of such insulated conductor is a difficult matter, particularly when it is desired to perform the electrical logging along with the drilling operation.

An object of this invention is a new method of and apparatus for the electrical exploration of geological strata traversed by bore hores wherein is avoided the necessity of using an insulated conductor in the drill hole.

The method and apparatus of the present invention are equally applicable to the exploration of bore holes simultaneously with the drilling operation or to the exploration of bore holes in which the drilling either has been completed or suspended.

According to this invention, an electrode is suspended in the bore hole by means of an uninsulated electrical conductor. This electrode is insulated from the conductor by means of an insulator made with a hollow space inside. A source of electrical energy is contained in this hollow insulator and one pole of this source is connected to the electrode while the other is connected to the conductor. This electrode arrangement is lowered to different depths in the bore hole and at each depth a measurement is made of the electrical potential produced between two points at the surface of the earth. The potential difference at the surface is proportional to the current flowing through the electrode and is therefore a measurement of the conductivity of the formations traversed by the electrode. The electrode may constitute the drill bit, in which event, the drill stem will constitute the conductor or the electrode may be a suitable piece of metal supported by a bare wire. From the potential measurements made at different depths of the electrode, a depth potential curve is charted. As long as the electrode traverses strata of uniform resistivity, the current flow in the earth produced by the source of electric current remains practically constant and the potential difference between said points decreases uniformly. However, if a formation is encountered by the electrode of either higher or lower resistivity, there will be a sharp change in the potential difference and by reason of this sharp change, it can be determined at what depth such formation exists.

Other objects, novel features and advantages of this invention will become apparent from the following specification and accompanying drawing, wherein:

Fig. 1 is a vertical section through a bore hole in which is provided one form of apparatus for practicing the invention;

Fig. 2 is a similar view illustrating another form of apparatus, and

Fig. 3 is a depth potential graph.

In Fig. 1 is illustrated an apparatus for practicing the invention in a completed bore hole or one in which the drilling operation has been discontinued. In the hole, a cylinder 10 of insulating material is suspended by a conductor 11 passing over a sheave 12 supported by any suitable means at the earth's surface, the conductor leading to a winch, not shown. An electrode 13 of any suitable conductive material and of any suitable configuration is attached to the lower end of the insulating tube 10. In the tube 10 is provided a source of electrical energy 14 herein shown as a battery, but which may be a generator of either alternating or direct current. One pole of said source 14 is connected to the electrode 13 while the other pole is connected to the conductor 11. On the surface of the earth are located two electrodes 15 and 16, which may be metal stakes driven into the ground, but preferably are porous pots filled with an electrolyte such as are used generally in electrical prospecting. A potentiometer 17 or other suitable potential recording device is connected between the electrodes 15 and 16. Alternatively, the electrode 16 may be connected directly to the conductor 11 instead of placing it in the ground near the bore hole.

In exploring a well with the apparatus of Fig. 1, the tube 10 is lowered to different depths in the bore hole and at each depth a reading is made of the potential recorded by the potentiometer 17. The current generated by the source 14 flows through the electrode 13 and follows the current lines 18 in the earth as indicated in Fig. 1, returning through the conductor 11 to the source 14. The magnitude of this current is mainly limited by the resistance of the earth formation immediately surrounding the electrode 13 because the conductor 11, being long, offers little resistance to the passage of current between it and the earth. The potential recorded at the surface by the potentiometer is proportional to the current flow through the electrode 13 and is, therefore, a measure of the conductivity of the formation adjacent the electrode.

The length of the tube 10 should be many times (ten to twenty times) the diameter of the bore hole so that the current path penetrates the formation. If the exploration is to reach a great depth, it is preferable that the tube 10 be of the order of twenty-five to fifty feet so that the potential recorded by the instrument 17 shall be as great as possible. Even a greater length for the tube might be preferable under some circumstances. The exact location of the electrodes 15 and 16 is immaterial, but one electrode should be near the top of the hole and the other should be spaced therefrom a substantial distance, preferably a distance comparable to the total depth of the hole to be explored. Preferably, the hole is filled with water or drilling mud to provide a conductive path between the electrode 13 and the geological formation which is to be explored. If no conducting liquid is present in the hole, provision must be made for making contact with the geological formation such as is illustrated in U. S. Patent No. 1,826,961.

From the potentiometer readings obtained at different depths is plotted the curve shown in Fig. 3 in which the potential is plotted against depth. As long as the electrode 13 traverses strata of uniform resistance, the current is practically constant and the potential recorded by the potentiometer decreases uniformly as the apparatus is lowered into the well, giving the smooth curve shown in the end portions of the graph of Fig. 3. However, if the electrode encounters a formation of either higher or lower resistance, there will be a sudden change in current with a consequent sharp change in potential recorded by the potentiometer 17. Thus, an indication such as shown in the intermediate part of the graph of Fig. 3 will result corresponding to a different resistance formation.

In Fig. 2 is illustrated an apparatus suitable for use in continuously recording the resistance of the succeeding strata during the drilling operation. A long cylindrical insulating container 20 which may be of Bakelite reinforced with steel is joined to the lower end of the drill stem 21. This container should be as long as permissible, preferably twenty-five to fifty feet, so that it will be many times the diameter of the hole. An opening is provided through the axis of the container 20 to allow the drilling mud to pass therethrough and the drilling bit 23 is attached to the lower end of the container. A battery 24 or other suitable source of electrical energy is contained in the annular space provided in the container 20, one terminal of the battery being connected to the drill stem and the other to the drill bit. Electrodes 15 and 16 are placed on the surface of the earth as previously described with a potentiometer connected therebetween. The potential recorded by 17 is a measure of the conductivity of the formation at the bottom of the hole and the arrangement described provides for continuously recording the resistance of the formations encountered by the bit 23 without in any way interfering with the drilling operation.

It is contemplated that with the embodiment illustrated in Fig. 1, the potentiometer 17 will be of the recording type and will be geared to the sheave 12, in such position that the travel of its chart is proportional to the depth to which the electrode is lowered. Such an arrangement is now commonly employed in existing methods of surveying bore holes electrically and so is not herein described in detail. Should a recording potentiometer not be available, then a survey in accordance with the invention may be made by lowering the electrode to a given depth and reading the potential indicated by the potentiometer for such depth. It is further to be understood that various modifications may be made in the structure of the apparatus herein described without in any way departing from the spirit of the invention as defined in the appended claims.

I claim:

1. Apparatus of the character described comprising a tubular insulated container having a central passageway, means for connecting a drill bit to one end of said container, means for connecting th other end of said container to a drill stem, and a source of electric current in said container having one pole connected to said bit and its other pole connected to said stem.

2. In combination with a drill stem and a drill bit a tubular insulated container connected at one end to said drill stem and at the other end to said bit, and a source of electric current in said container having one pole connected to said drill stem and the remaining pole connected to said drill bit.

3. In combination with a drill stem and a drill bit a tubular insulated container connected at one end to said drill stem and at the other end to said bit, a source of electric current in said container having one pole connected to said drill stem and the remaining pole connected to said drill bit, and means for measuring the potential difference between spaced points on the earth's surface.

4. In combination, a drill stem, an electrode mechanically connected to one end of said stem but insulated therefrom, and a source of electrical energy at said end of said drill stem having one terminal electrically connected to said drill stem and the other terminal electrically connected to said electrode.

5. In combination, a drill stem extending into a bore hole, an electrode mechanically connected to the lower end of said drill stem but insulated therefrom, a source of electrical energy at the lower end of said drill stem having one terminal electrically connected to said drill stem and the other terminal electrically connected to said electrode and grounded electrical energy detecting means connected to the surface end of said drill stem.

6. In combination, a drill stem extending into a bore hole, a hit mechanically connected to the lower end of said drill stem but insulated therefrom, a source of electrical energy at the lower end of said drill stem having one terminal electrically connected to said drill stem and its other terminal electrically connected to said bit, and grounded electrical energy detecting means connected to the surface end of said drill stem.

7. In combination, a drill stem extending into a bore hole, an electrode mechanically connected to the lower end of said drill stem but insulated therefrom, a source of electrical energy at the lower end of said drill stem having one terminal electrically connected to said drill stem and its remaining terminal electrically connected to said electrode, and electrical energy detecting means connected between two spaced points on the surface.

8. In exploration of geological formations traversed by a bore hole of the type bored by a drill stem terminating in a bit, the method of electrical exploration which comprises establishing a difference of electrical potential between said bit and said drill stem, and observing the potential produced at the earth's surface between a conductor effectively connected to the surface end of said drill stem and another conductor effectively grounded remote from said drill stem.

9. In exploration of geological formations traversed by a bore hole of the type bored by a drill stem terminating in a bit, the method of electrical exploration which comprises establishing a difference of electrical potential between said bit and said drill stem, and observing the potential produced at the earth's surface between two spaced grounded electrodes, at least one of which is remote from said drill stem, and observing said potential difference.

ERNEST E. BLONDEAU.

DISCLAIMER 2,310,611.—*Ernest E. Blondeau*, Tulsa, Okla. ELECTRICAL EXPLORATION OF GEOLOGICAL STRATA. Patent dated February 9, 1943. Disclaimer filed November 24, 1943, by the assignee, *Geophysical Research Corporation*.

Hereby enters this disclaimer to claim 4.

[*Official Gazette December 21, 1943.*]